(12) United States Patent
Lee et al.

(10) Patent No.: US 7,746,581 B2
(45) Date of Patent: Jun. 29, 2010

(54) DEVICE FOR TRANSFERRING LENS

(75) Inventors: Kyeong-eun Lee, Changwon (KR); Sang-whan Oh, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 12/315,226

(22) Filed: Dec. 1, 2008

(65) Prior Publication Data

US 2009/0153981 A1 Jun. 18, 2009

(30) Foreign Application Priority Data

Dec. 13, 2007 (KR) ...................... 10-2007-0129918

(51) Int. Cl.
  *G02B 7/02* (2006.01)
(52) U.S. Cl. ........................ 359/822; 359/821; 359/823
(58) Field of Classification Search ................. 359/811, 359/813, 818, 819–824
See application file for complete search history.

(56) References Cited

U.S. PATENT DOCUMENTS 5,150,260 A * 9/1992 Chigira ........................ 359/694
6,134,057 A * 10/2000 Ueyama et al. ............. 359/821

FOREIGN PATENT DOCUMENTS

| JP | 11-064706 A | 3/1999 |
| JP | 11-264925 A | 9/1999 |
| JP | 2006-201593 A | 8/2006 |
| JP | 2007-010944 A | 1/2007 |

* cited by examiner

*Primary Examiner*—Mohammed Hasan
(74) *Attorney, Agent, or Firm*—Drinker Biddle & Reath LLP

(57) ABSTRACT

A device for transferring a lens, including a lens installation member in which at least one lens is installed, a guide member guiding the lens installation member, a driver that transfers the lens installation member and comprises a lead screw, a clip member that comprises a thread part contacting the lead screw and an installation portion installed in the lens installation member, an installation pin that rotatably installs the clip member in the lens installation member, and an elastic member installed onto the installation pin. A first portion of the elastic member contacts the clip member and a second portion of the elastic member contacts the lens installation member. A portion of the lens installation member contacting the second portion of the elastic member has an inclined surface shape with respect to a longitudinal direction of the installation pin.

20 Claims, 6 Drawing Sheets

DEVICE FOR TRANSFERRING LENS

CROSS-REFERENCE TO RELATED PATENT APPLICATION

This application claims the benefit of Korean Patent Application No. 10-2007-0129918, filed on Dec. 13, 2007, in the Korean Intellectual Property Office, the entire contents of which is incorporated herein by reference.

BACKGROUND OF THE INVENTION

1. Field of the Invention

The present invention relates to a device for transferring a lens, and more particularly, to a device for transferring a lens, which can be used in photographing apparatuses such as cameras and camcorders.

2. Description of the Related Art

Photographing apparatuses such as cameras, camcorders, and the like have a focusing or zoom function. To perform such focusing or zoom function, a lens should be moved to a new position in some cases. Accordingly, a device for transferring the lens in an optical axis direction is required.

To transfer a lens in an optical axis direction, conventional devices for transferring a lens generally include a lens frame into which a lens is mounted, a guide for guiding the transferring of the lens frame, and a transferring device for transferring the lens frame in an optical axis direction. In addition, a variety of devices for transferring a lens have been developed according to the structure and kind of photographing apparatuses in which devices for transferring a lens are installed.

In particular, recently, as a small-sized portable photographing apparatus such as a digital camera has become popular, a device for transferring a lens, which occupies less space inside a portable photographing apparatus and can stably operate, is being developed.

SUMMARY OF THE INVENTION

The present invention provides a device for transferring a lens, which can stably adjust photographed images. Accordingly, an embodiment of the present invention provides a device for transferring a lens, comprising a lens installation member in which at least one lens is installed, a guide member guiding a transferring motion of the lens installation member, and a driver that transfers the lens installation member and comprises, for example, a lead screw. The device for transferring a lens further comprises a clip member that comprises a thread part contacting the lead screw and an installation portion installed in the lens installation member, an installation pin that rotatably installs the clip member in the lens installation member, and an elastic member installed onto the installation pin. A first portion of the elastic member contacts the clip member and a second portion of the elastic member contacts the lens installation member. A portion of the lens installation member contacting the second portion of the elastic member has an inclined surface shape with respect to a longitudinal direction of the installation pin.

At least one guide hole may be formed in the lens installation member, and the guide member may be inserted through the guide hole, thereby guiding the motion of the lens installation member. At least one guide groove may be formed in the lens installation member, and the guide member may be inserted through the guide groove, thereby guiding the motion of the lens installation member.

A clip member installation unit, in which the installation portion of the clip member is installed, may be formed at one side of the lens installation member. An installation hole may be formed in the installation portion, two mounting holes may be formed in the clip member installation unit to face each other, both ends of the installation pin may be respectively inserted into the mounting holes, and the center portion of the installation pin may be inserted through the installation hole. The driver may comprise a driving motor, and the elastic member may be a torsion coil spring.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Exemplary embodiments of the present invention will now be described in detail with reference to the accompanying drawings.

Figure 1:
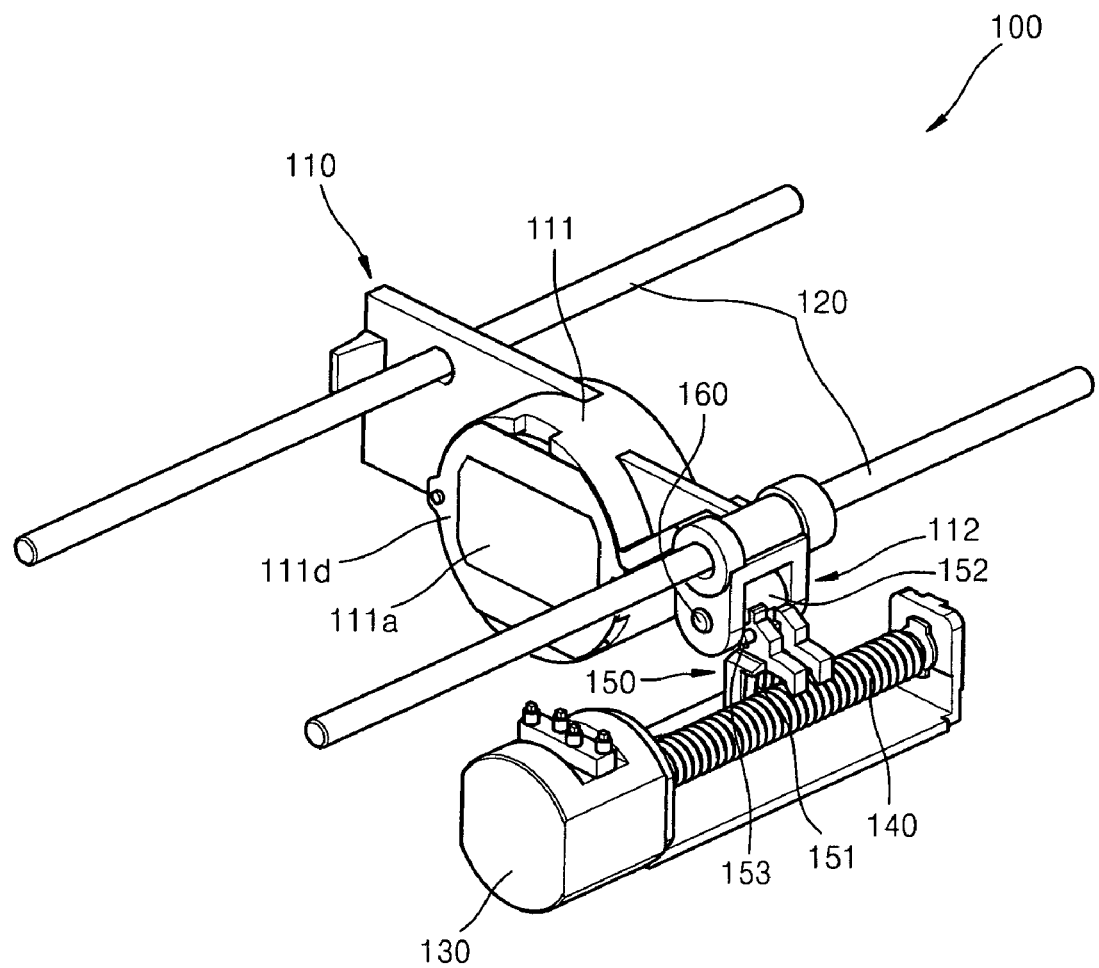
FIG. 1 is a perspective view of an example of a device for transferring a lens, according to an embodiment of the present invention.
Figure 2:
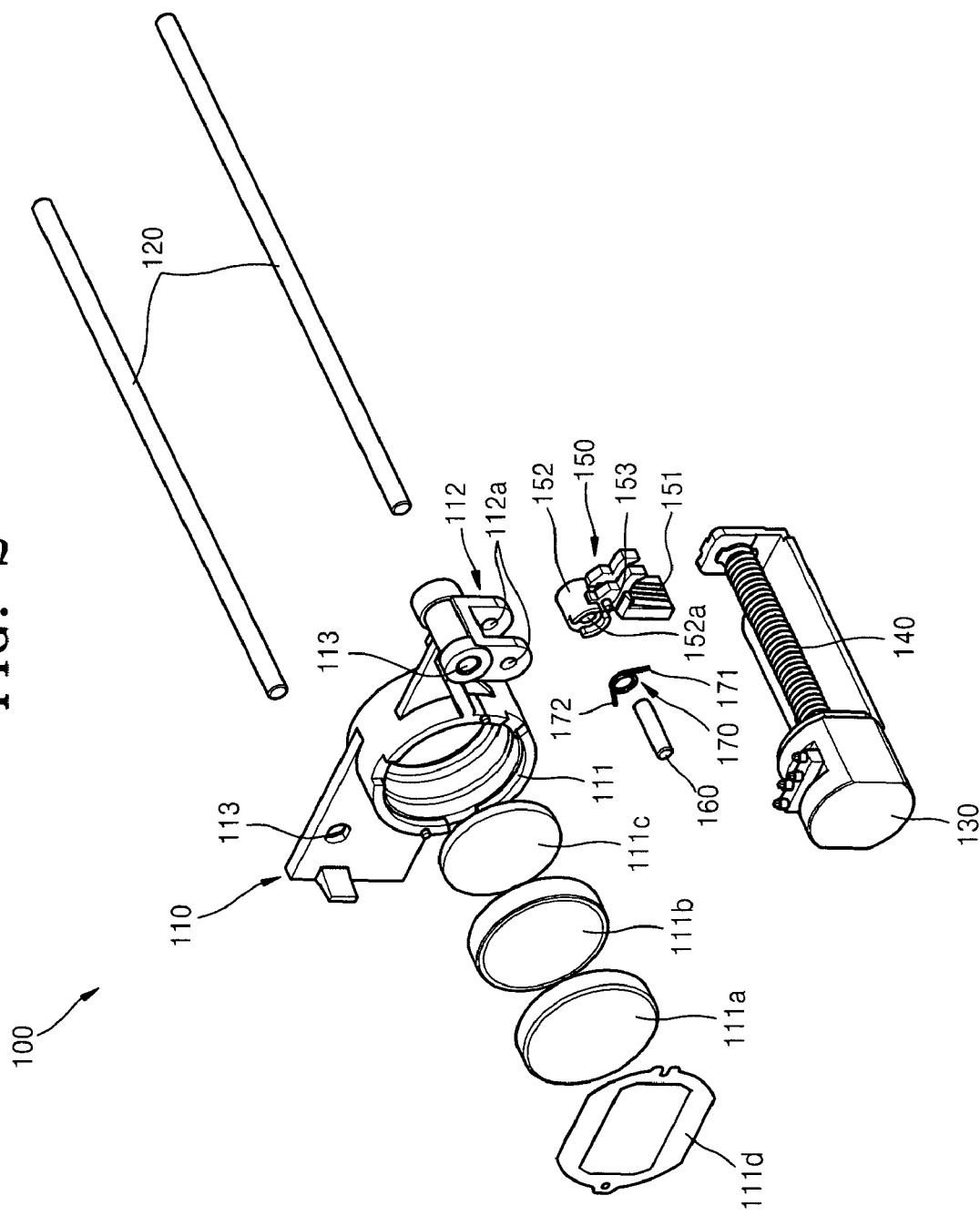
FIG. 2 is an exploded perspective view of the device for transferring a lens of FIG. 1.
Figure 3:
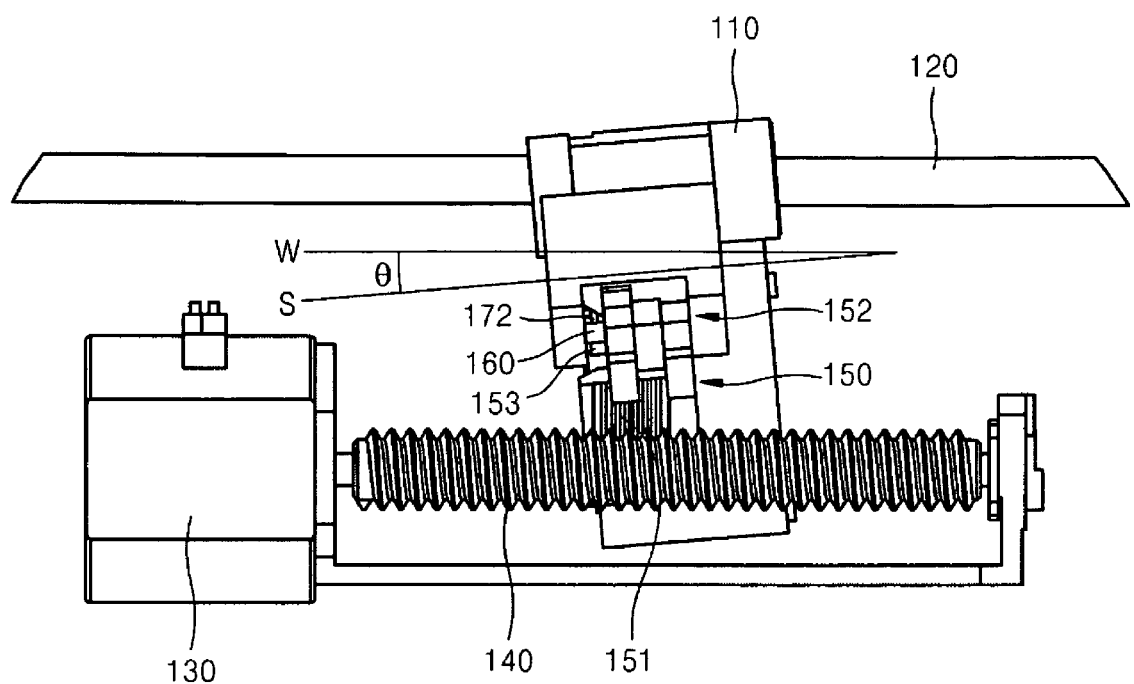
FIG. 3 is a right side view of the device for transferring a lens of FIG. 1.

FIG. 1 is a perspective view of an example of a device for transferring a lens, according to an embodiment of the present invention. FIG. 2 is an exploded perspective view of the device for transferring a lens of FIG. 1, and FIG. 3 is a right side view of the device for transferring a lens of FIG. 1. Referring to FIGS. 1 through 3, a device 100 for transferring a lens according to an embodiment of the present invention includes a lens installation member 110, guide members 120, a driving motor 130, a lead screw 140, a clip member 150, an installation pin 160, and a torsion coil spring 170. The device 100 for transferring a lens, according to this embodiment of the present invention, is installed inside a camera, but the present invention is not limited to such an arrangement. That is, the device 100 for transferring a lens can be used in any apparatuses that require moving a lens without limitation, such as camcorders, projectors, movie projectors, built-in cameras of portable mobile phones, and the like.

The lens installation member 110 includes a lens installation unit 111 and a clip member installation unit 112. Lenses 111a, 111b, and 111c and a mask 111d are mounted into the lens installation unit 111. The lenses 111a, 111b and 111c transmit image light, and a center axis of the lenses 111a, 111b, and 111c is referred to as an optical axis. The mask 111d fixes the lenses 111a, 111b, and 111c in the lens installation member 110 and also protects the lenses 111a, 111b and 111c.

According to this embodiment, the device 100 for transferring a lens includes three lenses 111a, 111b and 111c, however, the present invention is not limited to this arrangement. That is, the number of lenses mounted in the lens installation unit is not particularly limited. For example, one lens or any number of lenses (e.g., at least 4 lenses, may be mounted into the lens installation unit.

According to this embodiment, the mask 111d is mounted into the lens installation unit 111, however, the present invention is not limited to this arrangement. That is, the mask may not be mounted into the lens installation unit. In this case, to fix a lens in the lens installation unit, a separate fixing component, such as an adhesive or the like, may be used.

The clip member installation unit 112, in which the clip member 150 is installed, is installed at one side of the lens installation member 110. The clip member installation unit 112 has a shape of a hinge support unit, and two mounting holes 112a are formed in the clip member installation unit 112 to face each other in order to insert the installation pin 160 therein. In addition, a pair of guide holes 113 are symmetrically formed with respect to each other in the lens installation member 110. The pair of guide holes 113 are formed to insert the guide members 120 therethrough, thereby guiding a moving motion of the lens installation member 110.

According to this embodiment of the present invention, the guide holes 113 are formed in the lens installation member 110, however, the present invention is not limited to this arrangement. That is, the moving motion of the lens installation member can be guided by forming guide grooves instead of the guide holes 113.

The guide members 120 are formed in the form of a pole having a circular or substantially circular cross-section, and are inserted through the guide holes 113, thereby guiding the moving motion of the lens installation member 110. For this, both ends of the guide members 120 are fixed in a case or frame of a camera having the device 100 for transferring a lens.

Figure 4:
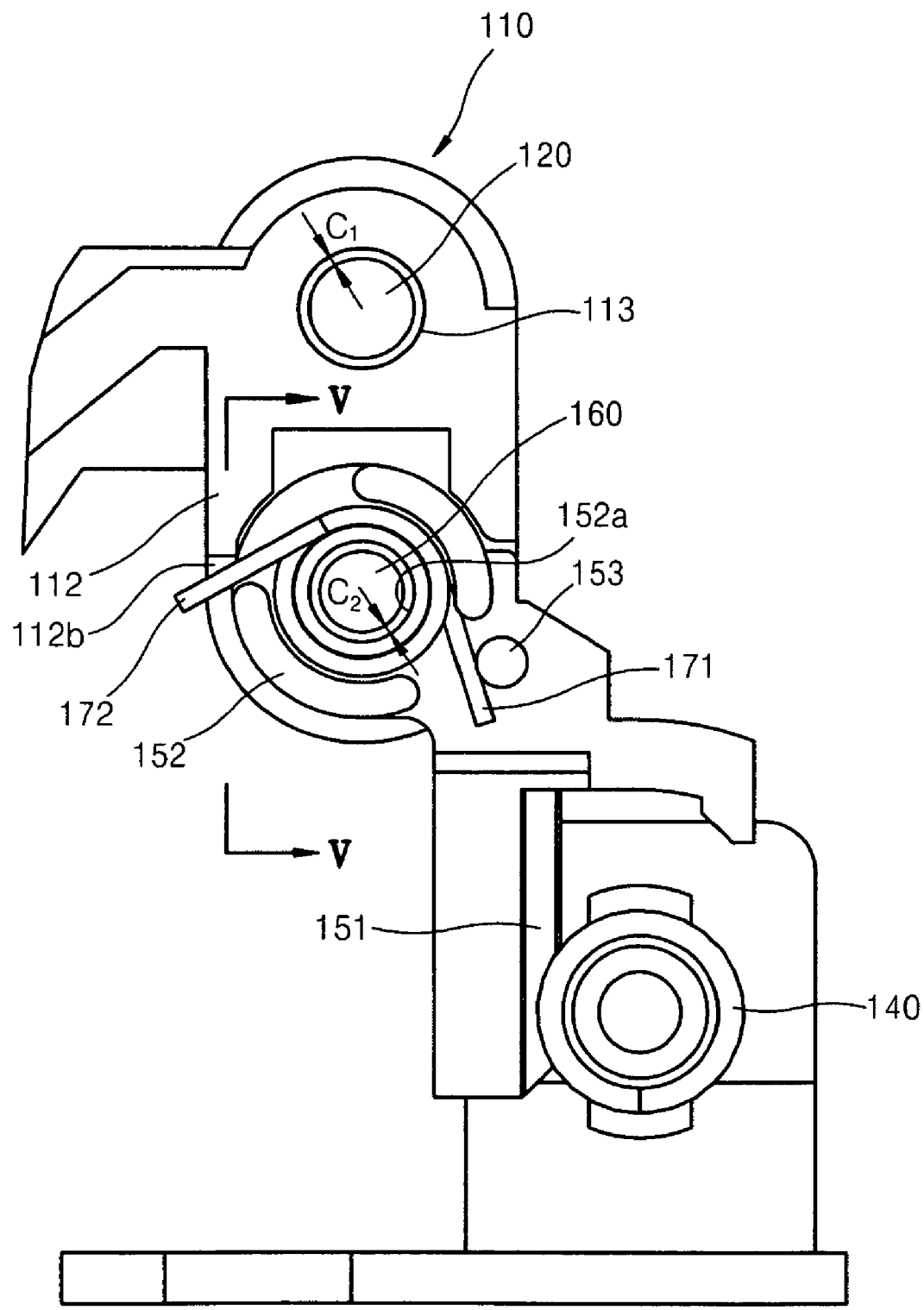
FIG. 4 is a schematic cross-sectional view showing an example of an assembled state of a torsion coil spring of a device for transferring a lens, according to an embodiment of the present invention.

The lens installation member 110 is guided by the guide members 120, and as illustrated in FIG. 4, a clearance $C_1$, is needed between an inner surface of the guide holes 113 and an outer surface of the guide members 120. That is, a size of the guide holes 113 is larger than that of the guide members 120, and therefore the lens installation member 110 can easily be transferred. However, if the size of the guide holes 113 is excessively larger than that of the guide members 120, the lens installation member 110 can shake excessively while being transferred, resulting in degradation of quality of images to be photographed. Therefore, the size of the guide holes 113 and guide members 120 should be such to provide the appropriate clearance between the respective guide holes 113 and the guide members 120.

According to this embodiment, the guide members 120 are formed in the form of a pole having a circular or substantially circular cross-section, however, the present invention is not limited to this arrangement. That is, the shape of the guide member according to the present invention is not particularly limited. For example, the guide member may be formed in the form of a pole having a tetragonal cross-section, or any other suitable cross-sectional shape.

According to this embodiment, the guide members 120 and the guide holes 113 are respectively formed in pairs, that is, two guide members and two guide holes. However, the present invention is not limited to this arrangement. That is, the number of the guide members and the guide holes is not particularly limited. For example, three guide members and three guide holes may be formed, or any suitable number of guide members and guide holes may be used.

The driving motor 130 and the lead screw 140 are used in this example as a main driver for transferring the lens installation member 110. The driving motor 130 transfers the lens installation member 110 according to a control signal. That is, an axis of the driving motor 130 is configured to be rotated clockwise or counterclockwise according to the control signal.

A general motor or a geared motor can be used as the driving motor 130. The lead screw 140 is installed at the axis of the driving motor 130, thereby being rotated according to the operation of the driving motor 130. The lead screw 140 includes a thread formed on an outer surface thereof, and the thread is engaged with a thread part 151 of the clip member 150 to convert a rotation motion of the lead screw 140 to a linear motion of the clip member 150.

The clip member 150 converts the rotation motion of the lead screw 140 to linear motion, and makes the lens installation member 100 tilt forward. The clip member 150 includes the thread part 151, an installation portion 152, and a fixing protrusion 153.

The thread part 151 contacts the thread formed on the outer surface of the lead screw 140. Herein, when the lead screw 140 is rotated, the thread part 151 is linearly moved along the thread of the lead screw 140.

The installation portion 152 is installed in the clip member installation unit 112. An installation hole 152a is formed in the center of the installation portion 152, and thereby, the installation pin 160 is inserted through the installation hole 152a when assembled. The fixing protrusion 153 contacts one end of the torsion coil spring 170.

In addition, the installation pin 160 enables the installation unit 152 to be installed in the clip member installation unit 112. For this arrangement, both ends of the fixing pin 160 are fixed by being respectively inserted into the mounting holes 112a, the center portion of the installation pin 160 is inserted through the installation hole 152a, and thus the installation portion 152 is installed in the clip member installation unit 112 to have a hinge structure. Therefore, the clip member 150 is rotatably installed at the lens installation member 110.

To rotatably install the clip member 150 at the lens installation member 110, the external diameter of the installation pin 160 is slightly smaller than the internal diameter of the installation hole 152a. That is, as shown in FIG. 4, a clearance $C_2$ is needed between an inner surface of the installation hole 152a and an outer surface of the installation pin 160.

In this embodiment of the present invention, the torsion coil spring 170 is used as an elastic member. The torsion coil spring 170 is installed onto the installation pin 160. A first end 171 of the torsion coil spring 170 contacts the fixing protrusion 153, and a second end 172 of the torsion coil spring 170 contacts an inclined surface 112b positioned inside the clip member installation unit 112. The torsion coil spring 170 is installed in a compressed state where a torsional moment is applied, and thus the torsion coil spring 170 after finally being installed has an elastic potential energy. As a result, the elastic force of the torsion coil spring 170 pushes the thread part 151 of the clip member 150 in a direction of the lead screw 140, thereby contacting the thread part 151 onto the lead screw 140. In addition, the torsion coil spring 170 makes the clip member 150 tilt forward, and consequently, also makes the lens installation member 110 tilt forward. Hereinafter, the configuration and action of the torsion coil spring 170 will be described in more detail with reference to FIGS. 4 through 6.

FIG. 4 is a schematic cross-sectional view showing an example of an assembled state of a torsion coil spring of a device for transferring a lens, according to an embodiment of the present invention. For convenience of explanation, it is illustrated that there is no inclination between the installation pin 160 and installation hole 152a, and between the guide members 120 and guide holes 113. However, in an actual assembled state of the current embodiment of the present invention, an inclination exists between the installation pin 160 and installation hole 152a, and between the guide members 120 and guide holes 113 as illustrated in FIG. 3.

Figure 5:
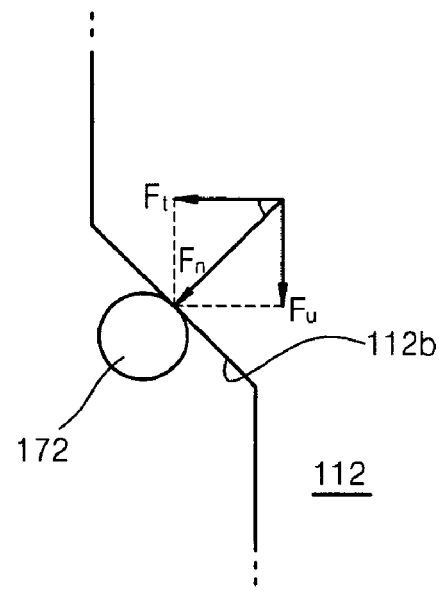
FIG. 5 is a schematic cross-sectional view taken along line V-V of FIG. 4.
Figure 6:
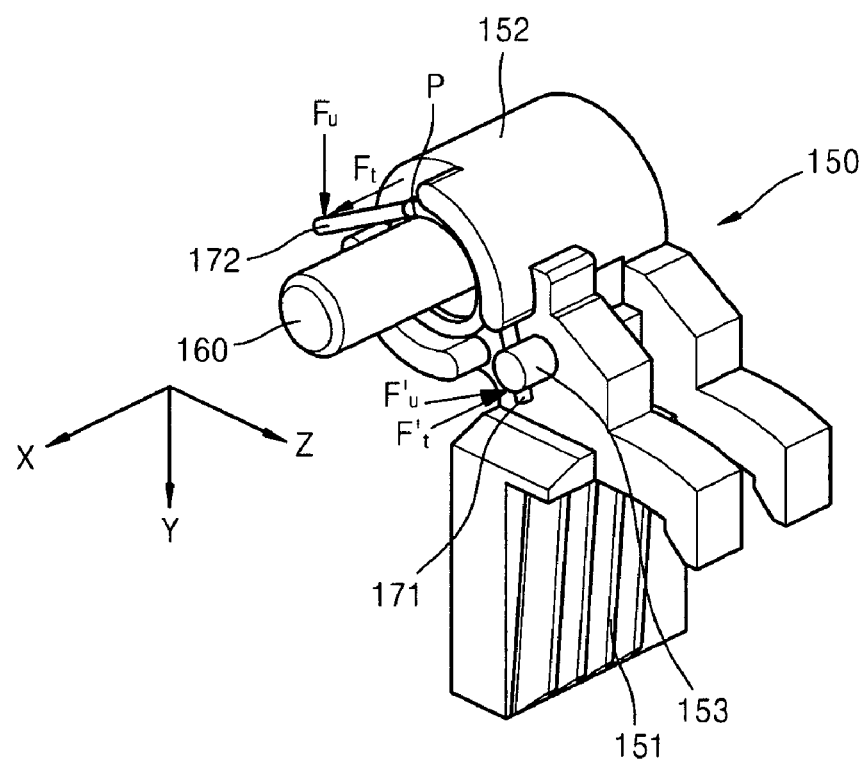
FIG. 6 is a schematic view showing an example of the manner in which a torsion coil spring acts on a clip member in a device for transferring a lens according to an embodiment of the present invention.

In addition, FIG. 5 is a schematic cross-sectional view taken along line V-V of FIG. 4, and illustrates a case where the second end of the torsion coil spring and an inclined surface of the clip member installation unit contact each other. FIG. 6 is a schematic view showing how a torsion coil spring acts on a clip member, in a device for transferring a lens according to an embodiment of the present invention.

As described above, the first end 171 of the torsion coil spring 170 contacts the fixing protrusion 153, and the second end 172 of the torsion coil spring 170 contacts the inclined surface 112b positioned inside the clip member installation unit 112. Herein, the inclined surface 112b has a shape inclined with respect to a longitudinal direction of the installation pin 160, which results in the following operation of the torsion coil spring 170.

That is, as illustrated in FIG. 5, a normal force $F_n$ can be defined as a reaction force caused by the elastic force of the torsion coil spring 170. The normal force $F_n$ is a force that acts perpendicular to the second end 172 of the torsion coil spring 170 from the inclined surface 112b. The normal force $F_n$ can be divided into a force $F_t$ in a longitudinal direction of the installation pin 160 and a force $F_u$ perpendicular to the longitudinal direction of the installation pin 160.

As illustrated in FIG. 6, when the force $F_t$ acts on the second end 172 of the torsion coil spring 170, the first end 171 of the torsion coil spring 170 pushes the clip member 150 by the force $F_t'$. That is, when the force $F_t$ acts on the torsion coil spring 170 installed onto the installation pin 160, the torsion coil spring 170 is rotated around a contact point P between the torsion coil spring 170 and the installation pin 160 by a friction force therebetween. As a result, the force $F_t'$ that has the same or substantially the same magnitude as and a different direction from the force $F_t$ pushes the clip member 150, and thus the clip member 150 is inclined forward. The degree of inclination of the clip member 150 is in proportion to a size of clearance $C_2$ between the inner surface of the installation hole 152a and the outer surface of the installation pin 160.

That is, this principle will be described using an xyz coordinate system illustrated in FIG. 6. If the first end 171 of the torsion coil spring 170 pushes a contact surface in the vicinity of the fixing protrusion 153 by the force $F_t'$ in a negative direction of an X axis, the clip member 150 is rotated counterclockwise around a Z axis. Thus, the clip member 150 is a little inclined forward.

In addition, the end 171 of the torsion coil spring 170 pushes the fixing protrusion 153 by a force $F_u'$ in addition to the force $F_t'$. Herein, the force $F_u'$ is generated by the force $F_u$ and an elastic force of the torsion coil spring 170. That is, if the force $F_u'$ acts on the fixing protrusion 153, the clip member 150 is rotated counterclockwise around the x axis, and the thread part 151 of the clip member 150 contacts the lead screw 140.

If the thread part 151 of the clip member 150 contacts the thread of the lead screw 140 and the lead screw 140 is rotated in a state where the clip member 150 is inclined forward, the lens installation member 110 is also inclined forward due to the inclination of the clip member 150 as illustrated in FIG. 3. That is, the existence of the inclined surface 112b allows the clip member 150 to be inclined forward with respect to the clip member installation unit 112 and further allows the lens installation member 110 to be inclined with respect to the guide members 120 and the lead screw 140. Herein, when the lens installation member 110 is inclined, the magnitude of the inclined angle θ is in proportion to the size of the clearance $C_1$ between the guide member 120 and the guide hole 113.

In this embodiment, the torsion coil spring 170 is used as an elastic member, however, the present invention is not limited to this arrangement. That is, even if the torsion coil spring is necessarily used, any other type of elastic members which can be installed onto the installation pin, thereby allowing the clip member 150 to be inclined, may be used. For example, the elastic member may be a leaf spring having a hole at its center, an elastomer composed of a synthetic resin, or the like.

Hereinafter, an operation process of the device 100 for transferring a lens, according to the current embodiment of the present invention, will be described with reference to FIG. 3. As described above, the second end 172 of the torsion coil spring 170 is installed to contact the inclined surface 112a, and thus the clip member 150 and the lens installation member 110 are inclined forward by a predetermined angle θ with respect to an extending direction of the lead screw 140 and the guide members 120. The inclination of the lens installation member 110 at the predetermined angle θ occurs always, regardless of whether the shaft of the driving motor 130 rotates clockwise, counterclockwise, or operates.

The lens installation member 110 is inclined in the same or the substantially the same direction, and an angle between the optical axis S of the lenses 111, 112, and 113 and the extending direction W of the guide member 120, which is a transferring direction of the lenses, is quite always the same or substantially angle θ. Thus, when the inclined angle is measured by a user, images acquired by using the inclined lens can be adjusted easily and exactly.

That is, the lens installation member 110 is inclined at the same or substantially the same angle, regardless of whether the device 100 for transferring a lens operates. Thus, if users adjust the photographed images, image adjustment can be performed considering the lens installation member 110 that are always inclined at the same degree. Thus, the adjustment of the photographed images is easily conducted. Therefore, images with high quality can be stably obtained.

Hereinafter, a lens installation member of a device for transferring a lens, according to another embodiment of the present invention, will be described with reference to FIG. 7. In this embodiment, only different configurations from those in the previous embodiment of the present invention are described.

Figure 7:
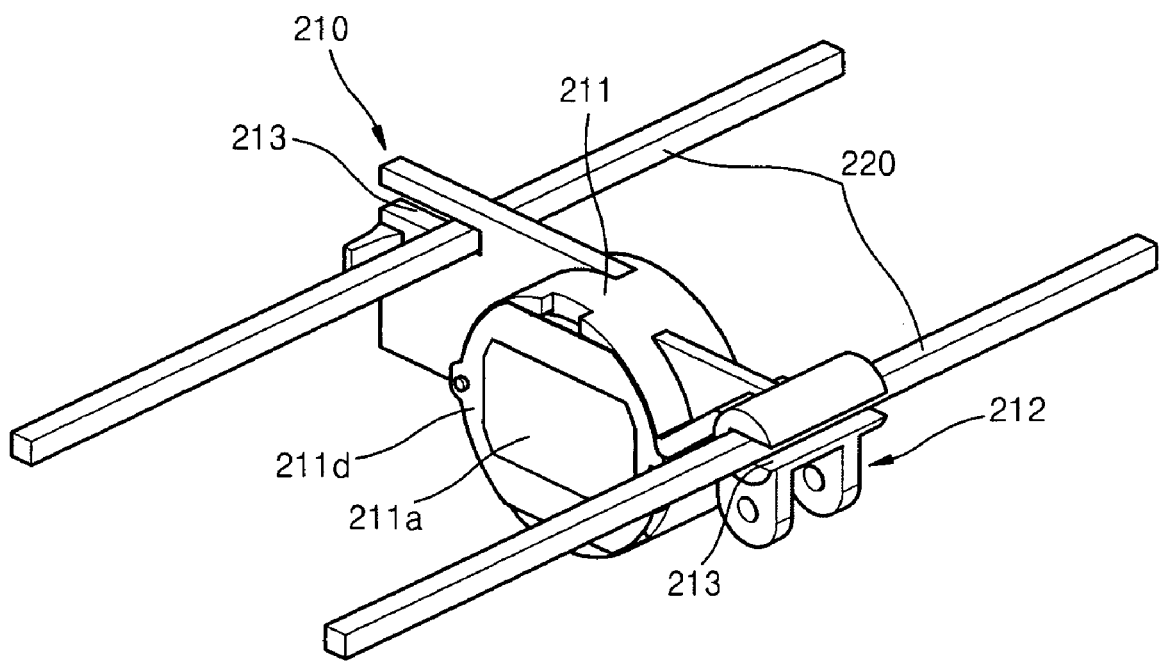
FIG. 7 is a perspective view of an example of a lens installation member and a guide member of a device for transferring a lens according to another embodiment of the present invention.

FIG. 7 is a perspective view of a lens installation member and a guide member in a device for transferring a lens, according to another embodiment of the present invention. A lens installation member 210 includes a lens installation unit 211 in which a lens 211a and a mask 211d are installed and a clip member installation unit 212. The lens installation member 210 has two guide grooves 213. That is, guide members 220 are inserted through the guide grooves 213, thereby guiding a transferring motion of the lens installation member 210. For this, a clearance exists between the guide groove 213 and the guide member 220.

According to this embodiment, the guide members 220 are formed in the form of a pole having a tetragonal cross-section, however, the present invention is not limited to this arrangement. That is, the shape of the guide member according to the present invention is not particularly limited. For example, the guide member may be formed in the form of a pole having a circular or substantially cross-section, or any other suitable cross-sectional shape.

Other elements of the lens installation member 210 and the guide member 220 according to another aspect of the present invention, besides the configurations thereof described above, are the same as those of the lens installation member 110 and the guide member 120 according to previous embodiment of the present invention, and thus their descriptions are omitted herein.

In the device for transferring a lens according to the present invention, photographed images can easily be corrected by using the device of the present invention, and thus images with high quality can be stably obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A device for transferring a lens, comprising:
   a lens installation member in which at least one lens is installed;
   at least one guide member guiding a transferring motion of the lens installation member;
   a driver that transfers the lens installation member and comprises a lead screw;
   a clip member that comprises a thread part contacting the lead screw and an installation portion installed in the lens installation member;
   an installation pin that rotatably installs the clip member in the lens installation member; and
   an elastic member installed onto the installation pin, wherein a first portion of the elastic member contacts the clip member and a second portion of the elastic member contacts the lens installation member,
   wherein a portion of the lens installation member contacting the second portion of the elastic member has an inclined surface shape with respect to a longitudinal direction of the installation pin.

2. The device of claim 1, wherein at least one guide hole is formed in the lens installation member, and the guide member is inserted through the guide hole, thereby guiding the motion of the lens installation member.

3. The device of claim 1, wherein at least one guide groove is formed in the lens installation member, and the guide member is inserted through the guide groove, thereby guiding the motion of the lens installation member.

4. The device of claim 1, wherein a clip member installation unit in which the installation portion of the clip member is installed is formed at one side of the lens installation member.

5. The device of claim 4, wherein an installation hole is formed in the installation portion, two mounting holes are formed in the clip member installation unit to face each other, both ends of the installation pin are respectively inserted into the mounting holes, and the center portion of the installation pin is inserted through the installation hole.

6. The device of claim 1, wherein the driver comprises a driving motor.

7. The device of claim 1, wherein the elastic member comprises a torsion coil spring.

8. The device of claim 1, comprising:
   a plurality of guide members; and
   wherein a plurality of guide holes are formed in the lens installation member, and each said guide member is inserted through a respective said guide hole, thereby guiding the motion of the lens installation member.

9. The device of claim 1, wherein the clip member further comprises a fixing protrusion, configured such that the first portion of the elastic member contacts the fixing protrusion of the clip member and the second portion of the elastic member is positioned between the installation portion and the inclined surface shape of the lens installation member.

10. The device of claim 1, wherein the lens installation member is inclined with respect to an extending direction of the guide member at an angle between an optical axis of the at least one lens and the extending direction of the guide member.

11. The device of claim 10, wherein the lens installation member remains inclined at the angle as the driver transfers the lens installation member along the guide member.

12. The device of claim 1 wherein the driver rotates the lead screw that engages the thread part of the clip member, such that the rotation of the lead screw transfers the lens installation member along the guide member.

13. The device of claim 2, wherein the guide hole is formed in the lens installation member above a location at which the installation portion of the clip member is coupled to the lens installation member.

14. The device of claim 3, comprising:
   a plurality of guide members; and
   wherein a plurality of guide grooves are formed in the lens installation member, and each said guide member is inserted through a respective said guide groove, thereby guiding the motion of the lens installation member.

15. The device of claim 1, wherein the elastic member urges the clip member in a rotational direction about the installation pin.

16. The device of claim 15, wherein the elastic member urges the clip member in the rotational direction to maintain the thread part of the clip member in contact with the lead screw.

17. The device of claim 5, wherein a center portion of the elastic member is installed on the installation pin and positioned between the two mounting holes when the ends of the installation pin are inserted into the mounting holes.

18. The device of claim 17, wherein the center portion of the elastic member is positioned inside the installation portion, and the installation portion of the clip member includes spaces, such that the first portion of the elastic member extends out of one of the spaces and the second portion of the elastic member extends out of the other of the spaces.

19. The device of claim 2, wherein the guide member has a substantially circular cross section.

20. The device of claim 3, wherein the guide member has a tetragonal cross-section.

* * * * *